Jan. 4, 1949.　　　　　L. P. EVANS　　　　　2,458,359
PROCESS OF MULTIPLE-ZONE REGENERATION
OF A MOVING BED CATALYST
Filed May 5, 1944　　　　　　　　　　　3 Sheets-Sheet 1

Fig. 1.

Louis P. Evans
INVENTOR

BY
ATTORNEY

Fig. 2

Jan. 4, 1949.                L. P. EVANS                2,458,359
                  PROCESS OF MULTIPLE-ZONE REGENERATION
                        OF A MOVING BED CATALYST
Filed May 5, 1944                              3 Sheets-Sheet 3

Louis P. Evans
INVENTOR

BY
ATTORNEY

Patented Jan. 4, 1949

2,458,359

UNITED STATES PATENT OFFICE 2,458,359

PROCESS OF MULTIPLE-ZONE REGENERATION OF A MOVING BED CATALYST

Louis P. Evans, Woodbury, N. J., assignor to Socony-Vacuum Oil Company, Incorporated, a corporation of New York Application May 5, 1944, Serial No. 534,188

5 Claims. (Cl. 252—242)

This invention has to do with processes for conducting exothermic or endothermic fluid reactions in the presence of a moving bed of particle form contact mass material which may or may not be catalytic to the desired reaction. Exemplary of processes of this kind is the regeneration of contact material catalysts which have been used for catalytic cracking of hydrocarbons. It is well known that hydrocarbons of gas oil nature boiling between about 500° F. and about 750° F. may be cracked to gasoline and other products by passing them at reaction conditions of temperature and pressure such as, for example, temperatures of the order of 800° F. and higher at pressures somewhat above atmospheric in contact with a solid adsorptive contact mass. Other processes of like nature are the catalytic cracking, hydrogenation, dehydrogenation or polymerization of hydrocarbons of low boiling range, catalytic treating, reforming, or desulfurization of gasolines and naphthas, catalytic partial oxidation and similar conversions of hydrocarbon materials.

Usually in such processes, the contact material may partake of the nature of fuller's earth or other natural or treated filtering clays and/or various syntheic associations of alumina, silica, or alumina and silica, any of which may or may not have other constituents added such as certain metallic oxides.

In a most recent form, the operation of such processes has been developed as one in which the particle form contact material is moved cyclically through two zones, in the first of which it is subjected to reaction and in the second of which it is subjected to the action of a fluid regeneration medium, such as a combustion supporting gas acting to burn off contaminant materials deposited upon the contact mass during reaction. In order to permit the use of contact material particles of sizes of the order of 1 to 6 mm. in diameter without undue attrition of said particles and undue abrasion of the apparatus, and for other reasons the above process has been developed as one in which the contact material flow from the regeneration and reaction zones is controlled or throttled at the bottom outlet of said zone, thereby causing the contact material to flow through said zones as substantially continuous masses or columns of particle form solid material.

The present invention has to do specifically with a method of continuous regeneration of contact material which may be applied to a cyclic process such as above described.

In a process such as the above, in which contaminant deposits which may, for example, consist of high molecular weight hydrocarbon compounds, are burned from a contact material, considerable quantities of heat may be liberated. It is of great importance that this heat be removed from the contact material and from the regenerator at rates sufficient to prevent the overheating and damaging of the contact material thereby. Heretofore, this heat removal has been accomplished by the provision in the regenerator burning zone of heat transfer surfaces, such as tubes, through which is circulated a heat removing medium. Generally, such processes involve substantially uniform heat removing capacity in all sections of the burning zone.

It has now been found that the rate of contaminant combustion may vary widely during different stages of contaminant removal. Thus, in the burning of a contaminant consisting chiefly of high molecular weight compounds of hydrogen and carbon, the maximum possible burning rate may be very high during the initial stages when the more readily combustible hydrocarbons are preferentially burned and when the contaminant deposited on the surface and in the larger diameter capillaries of contact material is preferentially removed, and the burning rate may be very low during the later stages of regeneration when less readily combustible carbon and the contaminant deposited in the smaller diameter capillaries of the catalyst is burned. Obviously, the rate of heat release will also vary in different stages of the regenerator. Moreover, due to a general decrease in the heat of combustion with decrease in the percentage of hydrogen burned with the carbon constituent of the contaminant, this variation of heat release in the various zones of the regenerator is accentuated.

Furthermore, it has been found that the maximum possible rate of contaminant combustion may be to some extent controlled by the type of the contact material. The burning rate has also been found to decrease with increase of contact material particle diameter and density. For example, in general, contaminants may be much less rapidly burned from certain catalysts partaking of the nature of synthetic associations of silica and alumina or silica and other metallic oxides than from natural clay catalysts, especially during the later stages of the regeneration when the contaminant deposited in the smaller capillaries of the contact material must be removed. Since some of these catalysts are of great importance from catalytic cracking and process viewpoints, their use is highly desirable. This may in many instances result in requirements of additional regenerator capacity.

A major object of this invention is the provision of a method for the conducting of endothermic or exothermic fluid reactions in the presence of a flowing mass of particle form contact material, while controlling the temperature of said contact material at desired levels without the use of added heat transfer surfaces or tubes within the burning zone of the regenerator.

A further object of this invention is the provision of a method for regenerating spent contact materials by burning therefrom a contaminant deposit while removing the excess heat liberated by said contaminant burning from the contact material where necessary to prevent overheating thereof without the use of heat transfer or cooling surfaces within the burning zone of the regenerator.

Another object of this invention is the provision in a method for contact material regeneration, such as described above, the further provision of a method of controlling the temperature of the contact material during various stages of the regeneration and of controlling the rate of contaminant combustion during various stages of its combustion, thereby permitting a more desirable contact material temperature control and burning rate control in various sections of the regenerator and improving the overall contaminant burning capacity of said regenerator.

These and other objects will appear from the following discussion of the invention.

The method of this invention is based on several discoveries which will now be briefly discussed.

It has been found in some instances that more efficient utilization of the combustion supporting gas and higher contaminant burning rates may be obtained by passing substantially all of the combustion supporting gas through a downwardly flowing substantially continuous mass or column of particle form contact material in a regenerator than can be obtained by passing said gas through baffled passages in said regenerator from the open or perforated edges of which passages the gas may contact surfaces of the contact material. It has been found further that in order to prevent channeling, and by-passing of the gas and contact material and other difficulties, the gas flow through the contact material should be restricted to rates which will not cause boiling of said contact material or interference with the normal direction of flow.

It has been found in some instances that by splitting the regenerator into a number of stages through which the contact material flows in series and the gas flows in parallel—rather than by using a long single stage regenerator—sufficient combustion supporting gas or mixture thereof with inert gas at an inlet temperature below that of the contact material in the stages may be passed through said stages to support contaminant combustion and also to remove enough heat to permit maintenance of the contact material above a minimum temperature which will support combustion and below a maximum temperature which will cause heat damage to the contact material, all of this being accomplished without boiling the contact material or seriously interfering with its normal direction of flow. This is, in general, a part of the method of my invention.

It has also been discovered that in such a method or process as above described a great flexibility of control of contact material temperature and contaminant burning rates in various stages of the regenerator may be obtained. Moreover, by use of quantities of combustion supporting gas in excess of those required for contaminant combustion, it has been found possible to speed up the rate of contaminant combustion in those stages where it has been found heretofore to lag, due either to change in contaminant composition or due to the nature of the contact material. This obviously increases the overall regenerator burning capacity and makes possible in some instances considerable reduction in required size of regenerator. It also makes possible more efficient and thorough regeneration of contact materials which have been heretofore regenerated only with considerable difficulty.

Furthermore, such a method eliminates the necessity for relatively expensive metal heat transfer surfaces within the regenerator and greatly reduces the apparatus cost.

In order to permit better understanding of the method of this invention, reference should now be made to the drawings attached hereto. Of these figures.

All of these drawings are highly diagrammatic in form.

Figure 1:
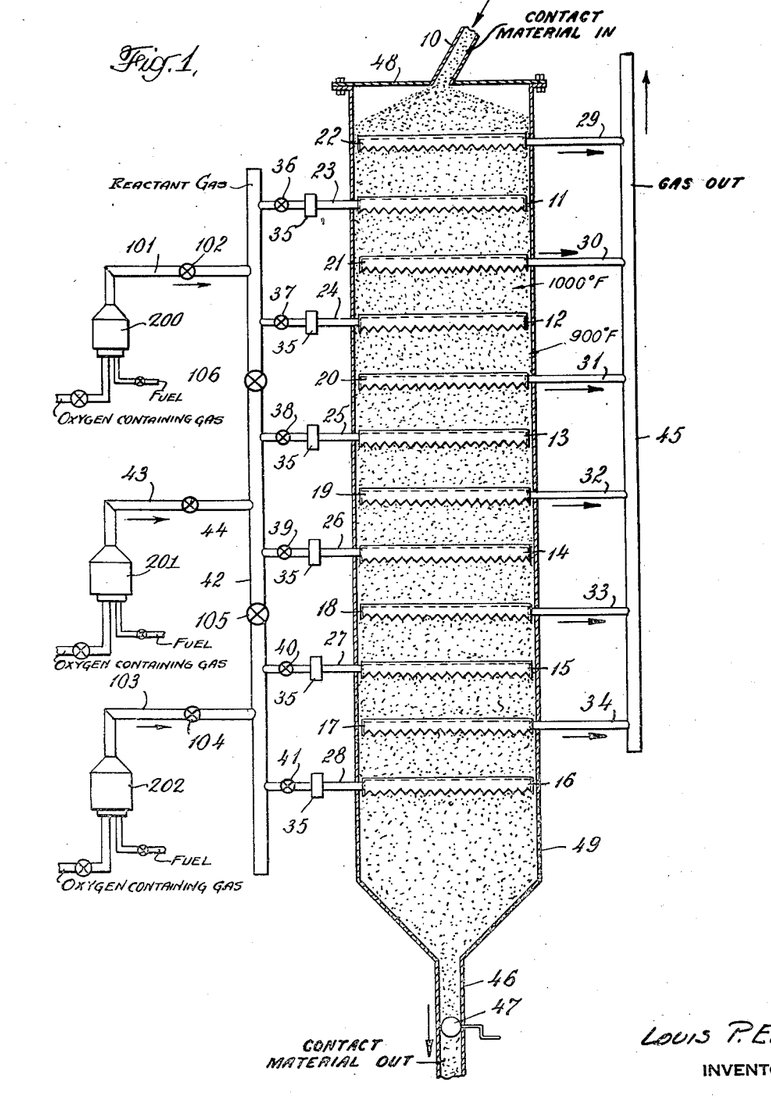
Figure 1 is an elevational view, partially in section, showing a form of apparatus suitable for the process of this invention.

Turning now to Figure 1, we find 49 is the shell of a regeneration vessel, which is used to confine a downwardly flowing column or bed of particle form contact material. Spaced at equal intervals of the length of the regenerator are rows of gas inlet distributor channels of which one in each row—11 through 16 inclusive—is shown. There are a number of these horizontally extending distributor channels in each row, space being provided between each channel for the free flow of contact material thereby. To each of these channels are connected gas inlet pipes such as 23–28 inclusive, respectively, which are in turn connected to an inlet manifold duct 42 which is fed by the main gas inlet pipe 43. Flow control valves 36 through 41 inclusive, and flow rate metering devices 35 are provided in each of said gas inlet pipes. Also spaced at intervals in the regenerator, equi-distant between the rows of distributor channels are rows of gas outlet collector channels such as 17–21 inclusive. These channels are of such size and shape as to permit disengagement of the gas from the contact material and as to prevent entrainment in the effluent gas of contact material particles of a sie which should desirably remain in the contact material stream. These channels are connected to outlet pipes such as 29–34 inclusive, which are in turn connected to the main outlet flue duct 45. Thus the regenerator is divided into a number of short burning stages through which contact material flows in series, each of said stages being provided with means for introducing and withdrawing gas.

In operation, spent particle form contact material passes through pipe 10 into the top of the regenerator, through each of the burning stages in series, and regenerated contact material is withdrawn from the bottom of the regenerator through the drain pipe 46 in which is the contact material flow throttle and control valve 47. Thus, the contact material passes through the regenerator as a substantially continuous bed or column of particle form solid material. The rate of said contact material flow is adjusted so that the total contaminant removed therefrom by all the stages is the required amount which must be removed. Combustion supporting gas such as air or a mixture of such gas and an inert gas such as flue gas pass from a blower or compressor (not shown) through pipe 43 into pipe 42 and then into the several burning stages in parallel through pipes 23-28 inclusive. The gas passing through said pipes passes then under the rows of distributing channels 11-16 inclusive, respectively, and is divided by each row of channels into two streams, one of which passes upwardly through the column of contact material above the channel at a rate of flow uniform across the entire cross-section of said column and the other of which streams passes downwardly through the column of contact material below the channel also at a uniform rate of flow. The gas then leaves the regenerator through channels 17-22 inclusive, each of which channels receives the effluent gas from two stages. For example, gas entering through pipes 26 and channels 14 divides and part passes upwardly through the contact material and out through channel 19 and the other part passes downwardly through the contact material and out through channels 18. Also channel 19 receives the effluent gas from the stage above and channel 18 receives the effluent gas from the stage below. The gas charged to each stage may be at atmospheric temperature or at a temperature above atmospheric but below that of the contact material in the stage, and the quantity of the gas charged to each stage may be controlled by the valves 36-41 inclusive, in pipes 23-28 inclusive, respectively. The temperature and rate of flow of the air or air and flue gas is controlled so as not only to support the contaminant combustion in each stage but also so as to control the temperature of the contact material in each stage within a temperature range which is most suitable for rapid combustion of contaminant of the particular composition existing in each stage, which temperature is broadly above the level which will support contaminant combustion and below the level which will cause heat damage to the contact material. Thus by so removing excess combustion heat as increased sensible heat of the excess air or air and flue gas, the need for heat transfer surfaces such as tubes in the regenerator is entirely eliminated.

The manner in which such a regenerator operates may be better understood by consideration of a typical example. Suppose a contaminant which in the intermediate and lower stages of the regenerator will burn readily above 900° F. is to be burned from a contact material which would be heat damaged at temperatures materially above 1200° F., a suitable operation would be obtained by controlling the residence time of the contact material in the uppermost stage and the rate and temperature of air flow into channels 11 and 12 in such a way that the temperature of the contact material would rise from a regenerator inlet temperature of, say, 800° F. to a temperature of, say, 1000° F. by the time it reaches gas outlet channel 20. By proper control of the rate of contact material flow between gas outlet channels 20 and 19, and by proper control of the inlet air rate and temperature to channel 13, the contact material would rise in temperature from 1000° F. to a set maximum allowable temperature of say, 1180° F. which it would reach at some intermediate point between said channels 20 and 13 and then the contact material would be cooled by the entering gas to say, 980° F. by the time it reaches channel 13. Then the contact material would be further cooled by the down flowing gas to say, about 905° F. at some point in the stage between channel 13 and channel 19, and after reaching said point the contact material would again gradually rise in temperature to about 1000° F. by the time it reaches gas outlet channel 19. It would then pass through a similar cycle in each subsequent stage although the temperature might be different. In all of the stages the stage length to cross-sectional area ratio would be made such that the required amount of air flow could pass through each stage without boiling the contact material or seriously disrupting its downward flow. Such operation would not be possible in long single stage regenerators having a single gas inlet and a single gas outlet, such as used heretofore.

Obviously with such a method of operation there will be a considerable excess of oxygen or of the combustion supporting constituent of the gas charge in the effluent gas from each stage. It has been found that by operating as above described, the rate of contaminant combustion is greatly increased over what it is with little or no excess $O_2$ in the effluent gas especially in those later stages where it normally becomes less rapid. Moreover, the rate of combustion of contaminants, deposited on catalysts which are particularly difficult to regenerate rapidly in these later burning stages, is greatly improved. The percentage of $O_2$ or combustion supporting constituent in the residual gas from each stage may be controlled over a relatively wide range by variation of rate of gas flow to each set of stages and by changing the inlet temperature of the gas to each stage or set of stages to permit the proper temperature control in the stages. Thus, air or air and flue gas may be charged at different temperature levels through line heaters 200, 201 and 202 on pipes 101, 43 and 103, respectively, and by closing valves 105 and 106 in duct 42, which were open in the operation described hereinbefore, air at different temperature levels may be charged to sets of inlet pipes 23 and 24, 25 and 26; and 27 and 28. The line heaters 200, 201 and 202 may be of conventional construction well known in the art. Further subdivision of the manifolding would also be possible if desired. It will be apparent that the percentage oxygen or combustion supporting constituent in the effluent gas from the regenerator stages is an indirect indication of the average oxygen or combustion supporting constituent in the gas passing through the regenerator. The average oxygen or combustion supporting constituent partial pressure in the gas passing through each stage may also be controlled by charging controlled quantities of inert gas along with the air charge to any given stage when the rate of reaction in that stage would otherwise be too rapid. This latter procedure is often very desirable in some of the earlier stages of the regenerator in which the rate of burning of some contaminants from some catalysts is so high as to cause very short burning zones resulting in localized overheating of the catalyst. By reduction of the oxygen partial pressure in the combustion supporting gas charge to such stages the rate of contaminant combustion can be readily controlled within such limits as will permit proper temperature control of the regenerating catalyst by the method and apparatus of this invention. It will be noted that generally the gas charge to the stages does not consist entirely of reaction supporting constituent as, for example, air which contains only about twenty-one per cent of the combustion supporting constituent. Of course, for some operations pure reaction gas may be charged to the stages within the scope of this invention.

Figure 2:
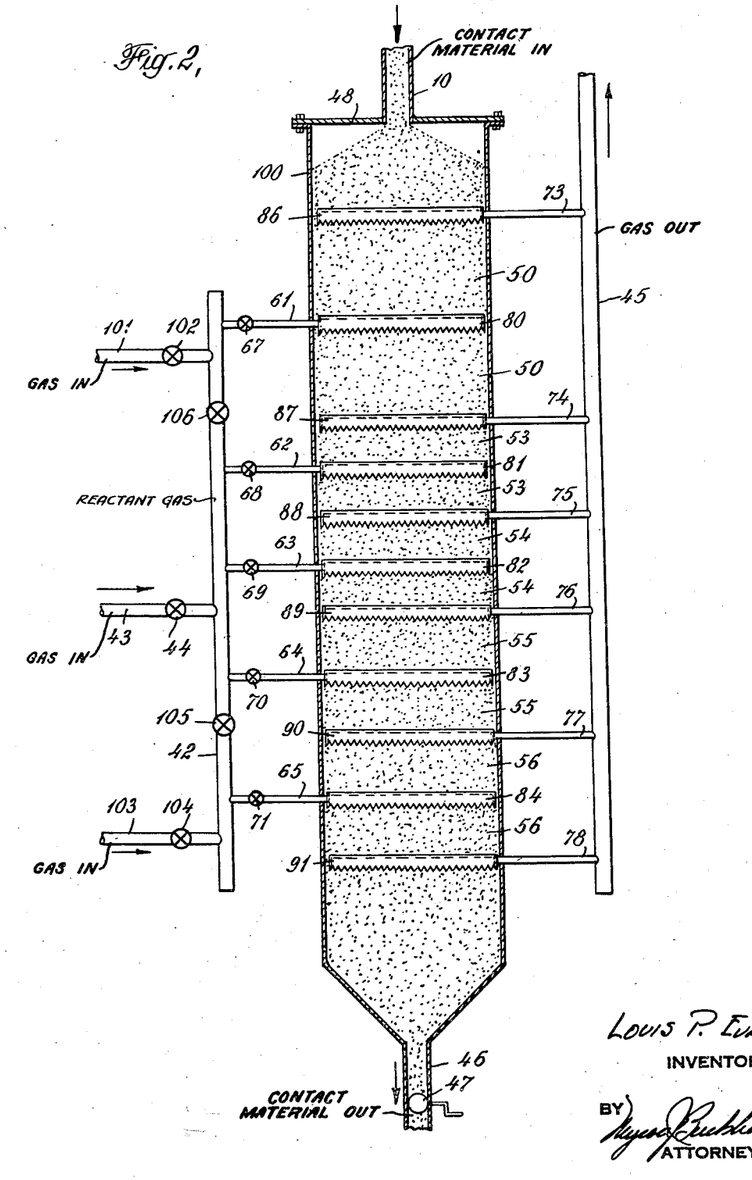
Figure 2 is also an elevational view, partially in section, of a modified form of this apparatus also suitable for the process and methods of this invention.

Since the rate of heat release due to contaminant combustion may vary in different stages of the regenerator, and different contact material temperature levels may be desirable in different stages, it is more often desirable to vary the length and volume of the stages, and use more nearly equal quantities of gas in each stage. Such a method of operation may be conducted in an apparatus such as shown in Figure 2. In Figure 2, 100 is the regenerator confining shell; 80–84 inclusive, are the rows of gas inlet channels, fed by pipes 61–65 inclusive and manifold duct 42 and transfer pipes 101, 103 and 43; and 86–91 inclusive are the gas outlet channels feeding outlet pipes 73–78 inclusive, respectively, and manifold duct 45. Again in inlet pipes 61–66 inclusive are the gas flow control valves 67–71 inclusive.

It will be seen that the channel spacing in this regenerator is such as to provide one relatively long burning stage 50 at the top of the regenerator, two relatively short intermediate burning stages 53 and 54, and two burning stages of intermediate length 55 and 56, in the lower section of the regenerator.

In the operation of this regenerator in a cyclic process, such as, for example, a continuous catalytic hydrocarbon cracking process, spent contact material may be charged through pipe 10 to the top of the regenerator at a temperature in the neighborhood of 800° F. This temperature may be below that at which the most rapid burning will take place so the temperature of the material may be permitted to rise in stage 50 by the heat liberated by contaminant combustion. Thus, relatively low gas rates calculated as cubic feet of gas per volume of catalyst in the burning stage may be used in burning stage 50 because relatively little cooling is required. Hence, the length of the stage 50 may be relatively long, and the percentage of O₂ in the effluent gas from said stage may be relatively low. This low oxygen content is practical since the burning rate in this stage will be high anyway due to the high percentage of hydrogen in the contaminant during the early burning stages. When the catalyst has reached stage 53 it may have reached a temperature of the order of 1000° F. at which favorable combustion rates are obtainable. Moreover, the catalyst in question may, for example, have a critical temperature of the order of 1150° F. above which it will be heat damaged. Consequently, in the stages 53 and 54, the contact material may be heated from its inlet temperature to a set temperature somewhat below the limiting temperature above which heat damage will result in a relatively small stage volume, and the amount of required cooling by the gas per volume of catalyst in said stage may be relatively great also necessitating a stage of relatively little volume and relatively great cross-section to length ratio to prevent boiling of the contact material in said stage by excessive gas rates. Thus, these stages 52–55 will be of relatively short length. Upon reaching the stages 55 and 56, the contact material may still be at temperatures of the order of 1000° F. but the readiness of the contaminant to burn has greatly decreased. Thus, in these stages more stage volume may be required to permit the contact material to reach the limiting peak temperature, and on the other hand a considerable percentage of oxygen in the effluent gases is desirable so as to permit maintenance of suitably high burning rates. The best compromise to satisfy these operation conditions is the use of stages of intermediate length in this section of the regenerator. Finally, regenerated material from which a substantial portion of the contaminant has been removed passes from the regenerator through pipe 46 and flow control valve 47 and may be subjected to some cooling in a zone (not shown) before return to the reaction vessel of the cyclic system.

Although it is generally desirable for structural reasons to make all stages of the same cross-sectional area and obtain the volume variation by variations of stage length, it is nevertheless within the scope of this invention to obtain the volumetric variation by variation of stage cross-sectional area and/or length. Moreover, it is often desirable to vary the volume of each stage rather than that of groups of stages as shown in Figure 2.

Flexibility in the rate of heat removed from each burning stage and in the percentage of combustion supporting constituent in the flue gas therefrom may be obtained by variations of gas charge rate and inlet temperature to each stage within the limit which will not cause boiling of catalyst or serious interference with its normal direction of flow through the regenerator.

In the apparatus shown in Figure 2, the volume variation between different stages was obtained by variation of stage length alone. The volume variation may also be obtained by variation of the horizontal cross-sectional area of the various stages or by such cross-sectional variation coupled with length variation. Moreover, although in the apparatus shown in Figure 1 or Figure 2, adjacent superposed stages shared common gas outlet channels and pipes, the apparatus may be modified so as to provide individual gas inlets and outlets for every stage. The gas flow may then be unidirectional in all the stages, being either downward or upward or the direction of gas flow may be opposite in adjacent stages. Generally, such design would provide for substantial isolation of the various stages as regards to gas flow therethrough by some adequate means of restricting the cross-section for flow between adjacent stages so that contact material flowing between adjacent stages would flow as substantially compact columns of adequate length and limited cross-section, said columns serving to substantially prevent the flow of gas between stages.

Figure 3:
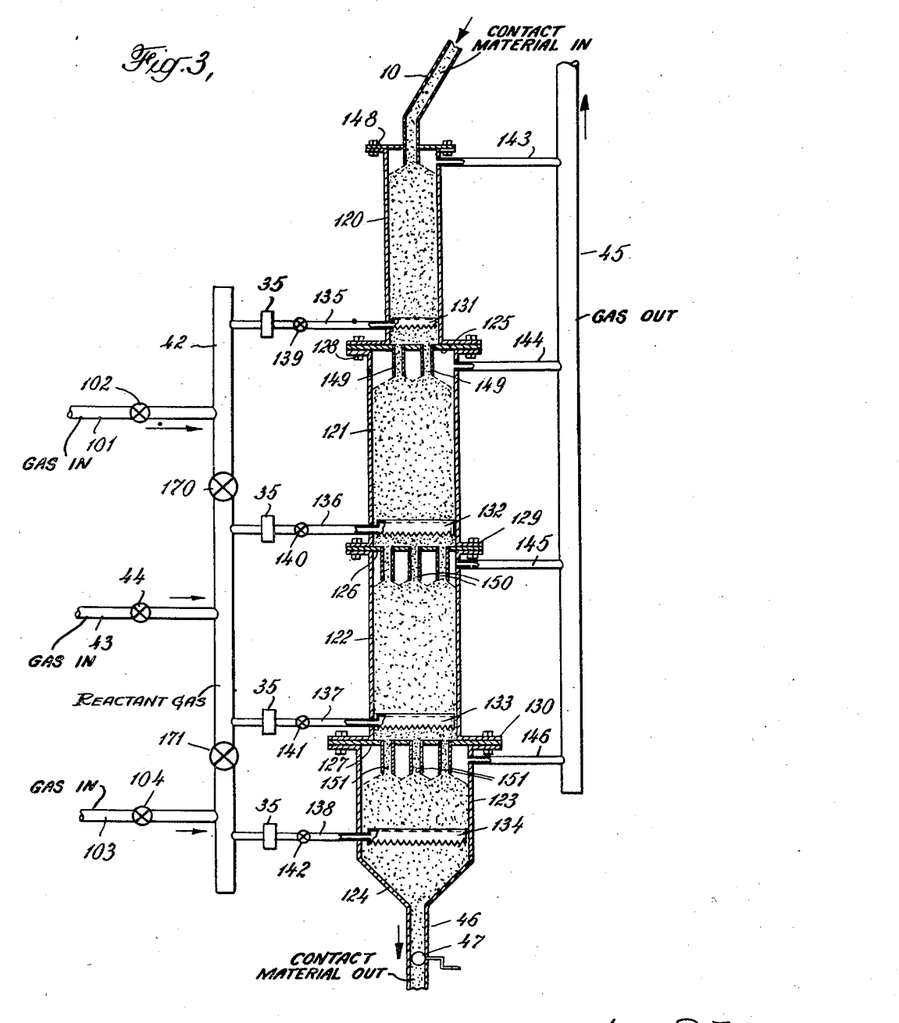
Figure 3 is an elevational view, partially in section, of another modification of this invention adopted to unidirectional flow of gas in all the burning stages.

Such a modification of the invention is shown in Figure 3, in which is shown a number of superposed stages 120 through 123 inclusive, connected together by means of flanges 128 through 130 inclusive. Also supported between said flanges are plates 125, 126 and 127 between sets of flanges 128, 129 and 130, respectively, said plates extending horizontally across the stage cross-sections. Dependent from the plates 125, 126 and 127 are pipes 149, 150 and 151 which are uniformly distributed with regards to the stage cross-sections within the upper end of the stage immediately below. These pipes serve as passages for the contact material passing downwardly from stage to stage and are of sufficient length and of sufficiently limited cross-section relative to that of the stages so as to prevent substantial flow of gas between stages when said pipes are filled with contact material. Each stage 120 through 123 inclusive, is provided with a row of individual gas inlet pipes 135 through 138 inclusive, having flow control valves 139 through 142 inclusive, respectively, therein and rate measuring devices 35 and with gas distribution channels 131 through 134, respectively, within said stages and associated with said inlet pipes. Each stage 120 through 123 inclusive, is provided near its upper end with gas outlet pipes 143 through 146, respectively. These outlet pipes are connected to the stage shells at the location of the solid free gas spaces formed in the upper end of each stage by the above-mentioned contact material passage pipes. The gas inlet pipes connect into duct 42 which is supplied with gas through pipes 101, 43 and 103, having valves 102, 44 and 104, respectively, therein. Valves 170 and 171 are also provided in the duct 42. The gas outlet pipes connect into outlet duct 45. The gas inlet pipe manifold arrangement is shown for the purpose of simplicity of drawing and it will be understood that other more suitable manifold arrangements may be used in actual installations. Spent contact material passes continuously into the uppermost stage 120 through pipe 10 and regenerated contact material is withdrawn from the lowermost stage 123 through pipe 46. The rate of contact material withdrawal is controlled by valve 47 in pipe 46 so as to maintain substantially compact beds of said contact material in all the stages.

In this modification, air or mixture of air and inert gas such as flue gas is charged at controlled rates and temperatures to the lower end of each stage and it then passes upwardly through the stages and is withdrawn from the upper ends thereof. The contact material would enter each stage excepting perhaps the uppermost stage at temperatures sufficient for rapid contaminant combustion, for example, 900° F. (in the case of clay-type solids bearing carbonaceous deposits from hydrocarbon conversion) and be heated as it passes through each stage to the predetermined maximum allowable temperature for that stage, for example, 1100° F. in stage 121, which temperature it would reach at some point above the air inlet channel and it would then be cooled by the air as it passed from said point down to the air inlet channel to a temperature suitable for rapid combustion in the next stage, for example, 900° F. The cycle would be repeated in each stage, although the set temperature limits might vary, the cooling by air in the last stage might be such as to cool the contact material to a temperature suitable for hydrocarbon conversion in the reaction vessel (not shown) which is the other vessel in the cyclic system. Each stage volume would be made such as to permit the desired cooling of the contact material, the desired amount of burning to be accomplished and the desired rise and fall in contact material temperature within the stage. Each stage cross-section would be sufficient to permit the required gas flow therethrough without causing boiling of the contact material.

It is also possible to admit gas to the upper end of each stage and withdraw it from the lower end thereof providing concurrent flow of gas and contact material in the stages. In this event, the contact material would generally enter each stage at a temperature somewhere near the set maximum allowable temperature, and it would be cooled in the upper section of each stage to a set temperature which is above the minimum which will support rapid contaminant combustion and it would then again be heated by the heat liberated by combustion in the lower part of the stage so that it would leave the stage at a temperature near the set maximum allowable.

It should be understood that the required number of stages in any of the modifications of this invention are dependent upon the total amount of contaminant to be burned from the contact material, the amount which may be burned in any given stage and other fixed operation condition. Since these factors vary depending upon the nature of the contact material and the contaminant, it will become apparent that the required number of stages can only be determined by study of a given fixed application of this invention.

It should also be noted that in any of the modifications of this invention the contaminant is being burned in all sections of any stage regardless of whether the contact material is rising or falling in temperature.

The volume of each stage is dependent to a great extent on both the volumetric rate of catalyst flow through a stage and upon the spread between the maximum and minimum allowable catalyst temperatures in said stage; the stage volume increasing with increase of either of said factors. The stage volume is also to some extent dependent upon the approximate desired air throughput rate, the rate of contaminant combustion and the rate of solid to gas heat transfer. Moreover, the proper stage volume may change depending upon the direction of gas flow in the burning stage. This follows because other things being equal, the stage volume is directly proportional to the amount of heat removed therefrom by the gas while controlling the catalyst temperature above the allowable minimum and below the allowable maximum during the passage through any given stage. For a given set total gas throughput rate, the allowable gas inlet temperature to the stage which will limit the rise in catalyst temperature to the set allowable maximum without overcooling the catalyst below the set allowable minimum adjacent the gas inlet may vary depending on whether the gas flow in the stage is concurrent, countercurrent or split with respect to the catalyst flow. Moreover, the gas outlet temperature will also vary. Thus it has been found that, other things being equal, and for equal gas throughput rates and catalyst throughput rates, stages in which the gas flow is concurrent with the catalyst flow should be of greater volume than those in which the gas flow is countercurrent. It will be apparent that the approximate required stage volume should be calculated for any given application of the invention. This may be conveniently done by considering any stage as divided into two sections, in one of which the catalyst is heated from its inlet temperature to the set maximum allowable catalyst temperature and in the other of which it is cooled from said maximum temperature to the set minimum allowable temperature. In stages where split gas flow is involved, it will be apparent that such stages can be conveniently considered as divided into two heating and two cooling sections. Heat balance equations may be set up for each section of the stage and solved against equations expressing the rate of solid to gas heat transfer in order to determine the proper gas inlet temperature and section volume. Certain data must, of course, be available before such equations, as above described, may be solved. This data is largely dependent upon the particular process and materials involved. Thus data on solid gas heat transfer rates depends upon the solid and gaseous materials involved as well as upon operating conditions; and such heat transfer data should be obtained from the literature or by means of simple heat transfer experiments on the specific materials. Much the same is true of contaminant combustion rates, such rates and the rate of heat release thereby being not only dependent upon the particular materials but upon the average temperature and pressure in the particular burning stage under consideration. Once having set upon a proper gas throughput rate in manner hereinafter shown and once having the heat transfer and burning rate data available, it will be possible to calculate the required gas temperature at the level in a given stage where the direction of catalyst temperature change reverses. Thus for example in a countercurrent flow stage at the level therein where the catalyst temperature reaches the set maximum and must thereafter decrease to the set outlet minimum, the rate of catalyst to gas heat transfer at said level must be equal to the rate of heat release by contaminant combustion. Knowing the rate of heat transfer per degree Fahrenheit at this level, the required gas temperature may be calculated. Thus only two unknowns, namely, the gas inlet temperature and the section volume will remain to be solved for each of the two sections of each burning stage.

It has been found that in the regeneration of clay-type catalysts bearing a carbonaceous contaminant deposited by gas oil cracking, a catalyst temperature spread between about 900° F. and 1150° F. is desirable in the intermediate burning stages. The amount of coke, figured as carbon, per cent by weight of the catalyst, that should be removed in such stages to obtain the above spread between catalyst inlet and maximum allowable temperature should be in the order of 0.1 to 3.0. In the upper stages of the regenerator a generally lower percentage carbon removal is found desirable and in the lower stages the reverse is true. It should be understood that these limits are intended merely as indicating preferable operation ranges for the particular operation described. Less satisfactory operation is obtainable outside these limits for the given operations and the limits themselves may change for certain other applications of the invention.

What the maximum allowable volumetric gas flow may be through a column of contact material of a given cross-section may best be determined experimentally for the particular contact material, gas and operating conditions involved. Such determinations may be made easily by anyone experienced in the art. In general, it has been found preferable to set an upper limit for the linear rate of gas flow between about 70% and 90% of that which would cause boiling of the contact material. Design and operation within these limits has been found to be more economical and satisfactory, but the use of any air rate on either side of these limits up to that which would cause contact material boiling is also within the scope of this invention provided sufficient gas is supplied to support the contaminant combustion and to remove the heat liberated thereby.

The lower allowable limit of volumetric gas flow through any stage is that which is required to support contaminant combustion in that stage. For some operations where the heat release due to combustion is relatively low the use of this lower limit of gas flow may suffice to support combustion and remove the heat liberated thereby.

Generally, the volumetric rate of gas flow to any stage as determined by heat balance and other considerations will fall between the hereinabove-described upper and lower limits. Usually for combustion of carbonaceous contaminants of the type deposited upon clay-type catalysts of hydrocarbon cracking reactions, it has been found desirable to charge to each stage between three to ten times the amount of air theoretically required to support the amount of contaminant combustion to be accomplished in that stage. Operations may sometimes be conducted in many instances outside these ranges, but generally the results are less desirable. Moreover these ranges are intended as being exemplary only for the type reaction described and they may vary for other applications.

The specific illustrations of apparatus and process applications shown hereinabove are intended to be only exemplary in character and this invention is in no way intended to be limited thereby, except as limited in the following claims.

I claim:

1. A method for regenerating particle form contaminant bearing inorganic adsorbents by the action of a combustion supporting gas comprising: maintaining a substantially compact, elongated column of downwardly moving inorganic adsorbent particles, continuously replenishing said column with spent adsorbent at its upper end and continuously withdrawing regenerated adsorbent from the lower end of said column, introducing a plurality of feed streams of combustion supporting gas, existing at a temperature substantially below the temperature in said column, into said column at a plurality of spaced apart levels along its length, splitting each of said feed streams into two portions, passing one portion of each feed stream upwardly through said column from the level of its introduction and passing the other portion of each stream downwardly through said column to effect combustion of the contaminant on said adsorbent, withdrawing gaseous combustion products from said column at a plurality of levels intermediate said levels of gas introduction, controlling the temperature and rate of said gas introduction at said plurality of levels to effect removal as increased sensible heat in the effluent gas of an amount of heat approximately equal to that released by the contaminant combustion in said column and maintaining the flowing contact material at most of the successive levels of gas withdrawal from said column at substantially the same intermediate temperature within the critical range defined by the minimum temperature required for rapid combustion of the contact combustion and the miximum temperature above which the contact material will suffer heat damage, whereby the contact material as it flows downwardly achieves about the same intermediate temperature at most successive levels of gas withdrawal and achieves a maximum temperature at levels in said column intermediate any given level of gas withdrawal and the level of gas introduction next below and achieves a minimum temperature at levels in said column intermediate any given level of gas introduction and the level of gas withdrawal next below, and limiting the maximum and minimum temperatures reached by the contact material at said intermediate levels within said critical range of temperatures by controlling the rate of contact material withdrawal from the lower end of said column.

2. A process for burning carbonaceous deposits formed in high temperature hydrocarbon conversion from a particle form solid inorganic catalytic material by the action of oxygen containing gas at controlled elevated temperatures comprising: maintaining a substantially compact column of said solid catalytic material in each of a series of superposed zones, each of said zones being in solid communication with adjacent zones, continuously supplying spent catalytic material to the uppermost zone at a temperature sufficient to initiate said contaminant combustion, continuously withdrawing regenerated catalytic material from the lowermost zone, introducing oxygen containing gas to each of said zones at a rate in excess of that required for the combustion of the carbonaceous deposit, passing the gas introduced into each zone through the column of contact material therein at a linear velocity below that which would disrupt the compact column to effect the combustion of said deposit, withdrawing gaseous combustion products together with unused oxygen from each zone while preventing substantial interflow of gas between adjacent zones, controlling the rate and temperature of gas introduction into the uppermost zone to effect an increase in the temperature of the contact material flowing therethrough to a level substantially above the inlet temperature of the contact material to said zone but below about 1150° F., effecting the removal of at least most of the heat liberated by contaminant combustion in each intermediate zone as increased sensible heat in said gas withdrawn from said zone by controlling the rate and temperature of introduction of said gas to said zone, and limiting the temperature fluctuation of the contact material as it passes through each intermediate zone within the range of temperature extremes defined by the contact material heat damaging temperature and the minimum practicable contaminant combustion temperature by controlling the residence time of the contact material within said intermediate zone, whereby the contact material outlet temperature from each intermediate zone is about equal to its inlet temperature to said zone and the contact material approaches an extreme temperature at an intermediate level in said zone, and controlling the rate and temperature of gas introduction to the lowermost zone to effect cooling of the contact material to an outlet temperature below that from any other zone.

3. A method for regeneration of particle form inorganic contact materials which have become spent by deposition of a carbonaceous contaminant thereon which comprises: passing said contact material downwardly through a series of burning zones through each of which it moves as a substantially compact mass of particles; supplying spent contact material to the first zone in the series and withdrawing regenerated contact material from the last zone in the series; independently introducing a combustion supporting gas into each of said burning zones at a temperature substantially below that of said contact material therein and passing the gas introduced into each zone through the compact mass of contact material therein parallel to the flow of the contact material to effect rapid burning of said contaminant, and then withdrawing the gaseous combustion products from each zone after it has been heated by the contact material, whereby the contact material fluctuates in temperature between a minimum extreme and a maximum extreme as it passes through each zone and reaches at least one of said extreme temperatures at least one intermediate level along said zone; maintaining a balanced relationship in at least most of said burning zones between the rate and temperature of gas introduction into the burning zone and the contact material residence time therein, wherein the gas inlet rate and temperature to each zone are controlled to effect the entire removal as increased sensible heat in the gas of sufficient of the heat released by the contaminant burning occurring in said zone to provide a contact material outlet temperature from the zone which is near the contact material entry temperature to said zone and wherein the contact material residence time in said zone is maintained suitable to restrict said temperature extremes achieved by the contact material flowing through said zone and particularly the extreme reached at said intermediate level within the range defined by the contact material heat damaging temperature and the minimum temperature required for rapid contaminant combustion.

4. A method for regeneration of particle form solid inorganic contact materials which have become spent by deposition of carbonaceous contaminants thereon which comprises: passing said contact material downwardly through a series of regeneration zones through each of which it flows as a substantially compact column of particle form contact material, supplying spent contact material to the first zone in the series and withdrawing regenerated contact material from the last zone in series, independently introducing combustion supporting gas into each zone near the lower end thereof at a temperature substantially below that of the column, passing said gas upwardly through the column in said zone at a linear velocity below that which will substantially disrupt the column to effect burning of contaminant from the contact material and withdrawing gaseous combustion products near the upper end of each zone at a temperature substantially above the gas inlet temperature to said zone, whereby the contact material rises in temperature as it flows through each zone reaching a maximum at an intermediate level in each zone and then decreases in temperature as it approaches the lower end of each zone; controlling the rate and temperature of said gas introduction to each of most of said zones to effect removal as increased sensible heat in the gas leaving said zone of substantially the net heat liberated by contaminant burning in said zone, whereby the contact material enters said zone at a set minimum temperature which is above that required for rapid burning of the contaminant and leaves said zone at substantially the same temperature, and controlling the contact material residence time in said zones to limit said maximum temperature reached by the contact material at any intermediate level in any zone below that which will cause substantial permanent heat damage to the contact material.

5. A method for burning contaminant deposits from a particle form solid inorganic contact material by the action of a combustion supporting gas within a controlled range of suitable regeneration temperatures which comprises: passing said contact material downwardly through a series of communicating burning zones in each of which it flows as a substantially compact column, supplying contaminant bearing contact material to the first zone in the series and withdrawing said contact material from which at least most of the contaminant has been removed from the last zone in the series; independently introducing combustion supporting gas into each zone near the upper end thereof at a rate in excess of that required to effect the contaminant burning and at a temperature substantially below that of the contact material column in said zone, passing said gas downwardly through the column in said zone to effect burning of contaminant from the contact material and withdrawing gaseous combustion products near the lower end of each zone at a temperature substantially above the gas inlet temperature to said zone, whereby the contact material decreases in temperature as it flows downwardly within each zone reaching a minimum at an intermediate level in each zone and then increases in temperature as it approaches the lower end of each zone; controlling the rate and temperature of said gas introduction to each of most of said zones to effect removal as increased sensible heat in the gas leaving said zone of most of the net heat liberated by contaminant burning in said zone but not substantially in excess of said net heat, and limiting the temperature fluctuation of the contact material as it passes through said zones within the range of temperature extremes defined by the contact material heat damaging temperature and the minimum temperature required for rapid contaminant burning by control of the residence time of the contact material in said zones, whereby the contact material outlet temperature from at least each of most of said zones is about the same as its inlet temperature thereto and the contact material approaches a minimum temperature extreme at an intermediate level in said zone.

LOUIS P. EVANS.

REFERENCES CITED

The following references are of record in the file of this patent:

UNITED STATES PATENTS

| Number | Name | Date |
|---|---|---|
| 1,155,402 | Bornmann | Oct. 5, 1915 |
| 1,784,536 | Pantenburg | Dec. 9, 1930 |
| 1,836,301 | Bechthold | Dec. 15, 1931 |
| 1,905,883 | Barstow et al. | Apr. 25, 1933 |
| 2,286,654 | Simpson et al. | June 16, 1942 |
| 2,303,717 | Arveson | Dec. 1, 1942 |
| 2,320,562 | Bransky | June 1, 1943 |
| 2,330,710 | Hemminger | Sept. 28, 1943 |
| 2,350,644 | Simpson et al. | June 6, 1944 |
| 2,409,596 | Simpson et al. | Oct. 15, 1946 |
| 2,410,309 | Simpson et al. | Oct. 29, 1946 |
| 2,417,393 | Evans | Mar. 11, 1947 |
| 2,419,245 | Arveson | Apr. 22, 1947 |

FOREIGN PATENTS

| Number | Country | Date |
|---|---|---|
| 645,654 | France | July 3, 1928 |